United States Patent Office 3,238,196
Patented Mar. 1, 1966

3,238,196
PROCESS FOR FORMATION OF
PYRROLIDINE RING
Wataru Nagata, Nishinomiya-shi, Hyogo, Tadao Terasawa, Takatsuki-shi, Osaka, and Tsutomu Aoki, Amagasaki-shi, Hyogo, Japan, assignors to Shionogi & Co., Ltd., Osaka, Japan
No Drawing. Filed Mar. 13, 1964, Ser. No. 351,822
Claims priority, application Japan, Mar. 14, 1963,
38/14,295
8 Claims. (Cl. 260—239.5)

The present invention relates to a process for formation of a pyrrolidine ring. More particularly, it relates to a novel process for preparing a pyrrolidine compound from the corresponding γ-ketalated oxo nitrile.

The process of the present invention may be represented by the following partial structural formulae:

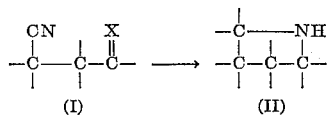

wherein X is a ketalated oxo group such as ethylenedioxy.

The present process comprises reducing a γ-ketalated oxo nitrile having the partial structural Formula I with a hydrogenated aluminum compound such as aluminum hydride, lithium aluminum hydride, sodium aluminum hydride and potassium aluminum hydride in an inert organic solvent such as tetrahydrofuran, dioxane and diglyme (diethyleneglycol dimethyl ether) to produce the corresponding pyrrolidine compound having the partial structural Formula II in a single step.

It is characteristic of the present invention to effect the above conversion by one step. For successful accomplishment of such one step conversion, the reduction must be carried out under a drastic condition, i.e. using large excess of the hydrogenated aluminum compound at a relatively high temperature during a long period. The amount of the hydrogenated aluminum compound to be used is usually about 20 to 100 moles, preferably about 40 to about 80 moles, to one mole of the starting γ-ketalated oxo nitrile (I). The reaction temperature may vary within a range from about 60° C. up to a decomposition temperature of the hydrogenated aluminum compound. For instance, when lithium aluminum hydride is used as the reducing agent, the reaction temperature may be from about 80 to about 110° C.

It is general knowledge that a ketal group is ordinarily not affected in the course of reduction using a hydrogenated aluminum compound. In fact, ketalation has been widely adopted in the field of organic chemistry for protection of a carbonyl group from reduction. However, under such a drastic condition as in the present reduction process, the protecting ketal group is split off simultaneously with formation of a bond between the ketal bearing carbon atom and the nitrogen atom of the amino group resulting from the original cyano group to constitute a pyrrolidine ring. In addition, the reduction of a γ-oxo nitrile can not effect such a pyrrolidine ring formation, and the previous ketalation of the γ-oxo group is indispensable for production of the objective pyrrolidine compound (II).

The present process can be generally and widely applied for formation of a pyrrolidine ring in various organic compounds with a great advantage over conventional methods. For instance, Marshall et al. accomplished the conversion of a γ-ketalated oxo nitrile, dl-3α-hydroxy-20-oxo-5β-pregnane-18-nitrile ethyleneketal, into the corresponding pyrrolidine compound, di-N-desmethyl-5β-conan-3α-ol, by three steps, i.e. (a) reduction of the cyano group with lithium aluminum hydride to an amino group, (b) elimination of the protecting ketal group on hydrolysis with intramolecular dehydration to form a pyrroline ring and (c) catalytic hydrogenation of the double bond of the pyrroline ring in the presence of platinum oxide [Marshall et al.: J. Am. Chem. Soc. vol. 84, p. 1485 (1962)]. The present process can realize such conversion in only one step.

Presently-preferred embodiments of the present invention are shown in the following examples. In these examples, abbreviations each has the conventional meaning: e.g., ml. millitre(s); mg. milligram(s); g. gram(s); ° C., degrees centigrade; M.P., melting point.

Example 1

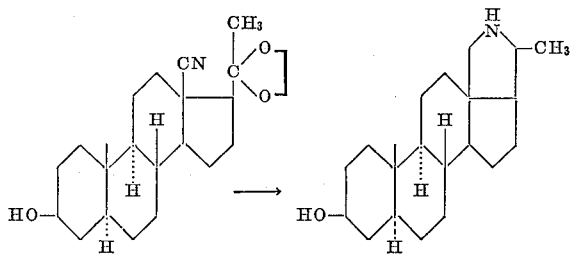

Preparation of dl-N-desmethyl-5α-conan-3β-ol: To a suspension of lithium aluminum hydride (4.7 g.) in a mixture of anhydrous diglyme (130 ml.) and anhydrous tetrahydrofuran (65 ml.), there is added dropwise a solution of dl-3β-hydroxy-20-oxo-5α-pregnane-18-nitrile ethyleneketal (2.4 g.) in a mixture of anhydrous diglyme (50 ml.) and anhydrous tetrahydrofuran (25 ml.) at room temperature (10 to 30° C.) The resultant mixture is heated at 95 to 100° C. for about 70 hours while stirring In the course of heating, lithium aluminum hydride (4.7 g.) is added portionwise thereto every 24 hours. The reaction mixture is portionwise added to a mixture of ice and water whereby excess of lithium aluminum hydride is decomposed. The resultant mixture is shaken with ether. The ether extract is washed with sodium chloride solution, dried over anhydrous sodium sulfate and the solvent removed by evaporation. The residue is crystalized from a mixture of tetrahydrofuran and ether to give dl-N-desmethyl-5α-conan-3β-ol (1.1 g.), which is further recrystallized from a mixture of methanol and ether to give thin plates. M.P., 200 to 201° C.

IR: $\nu_{max}^{Nujol}$ cm.$^{-1}$ 3473, 3258, 3123

Analysis.—Calcd. for $C_{21}H_{35}ON$: C, 79.44; H, 11.11; N, 4.41. Found: C, 79.00; H, 11.13; N, 4.62.

The starting material of this example, dl-3β-hydroxy-20-oxo-5α-pregnane-18-nitrile ethyleneketal, is prepared from 1,2,3,4,5,6,7,9,10,11α,12β,13α-dodecahydro-2-β-hydroxy-12-methyl-7-oxophenanthrene [Howell et al.: J.

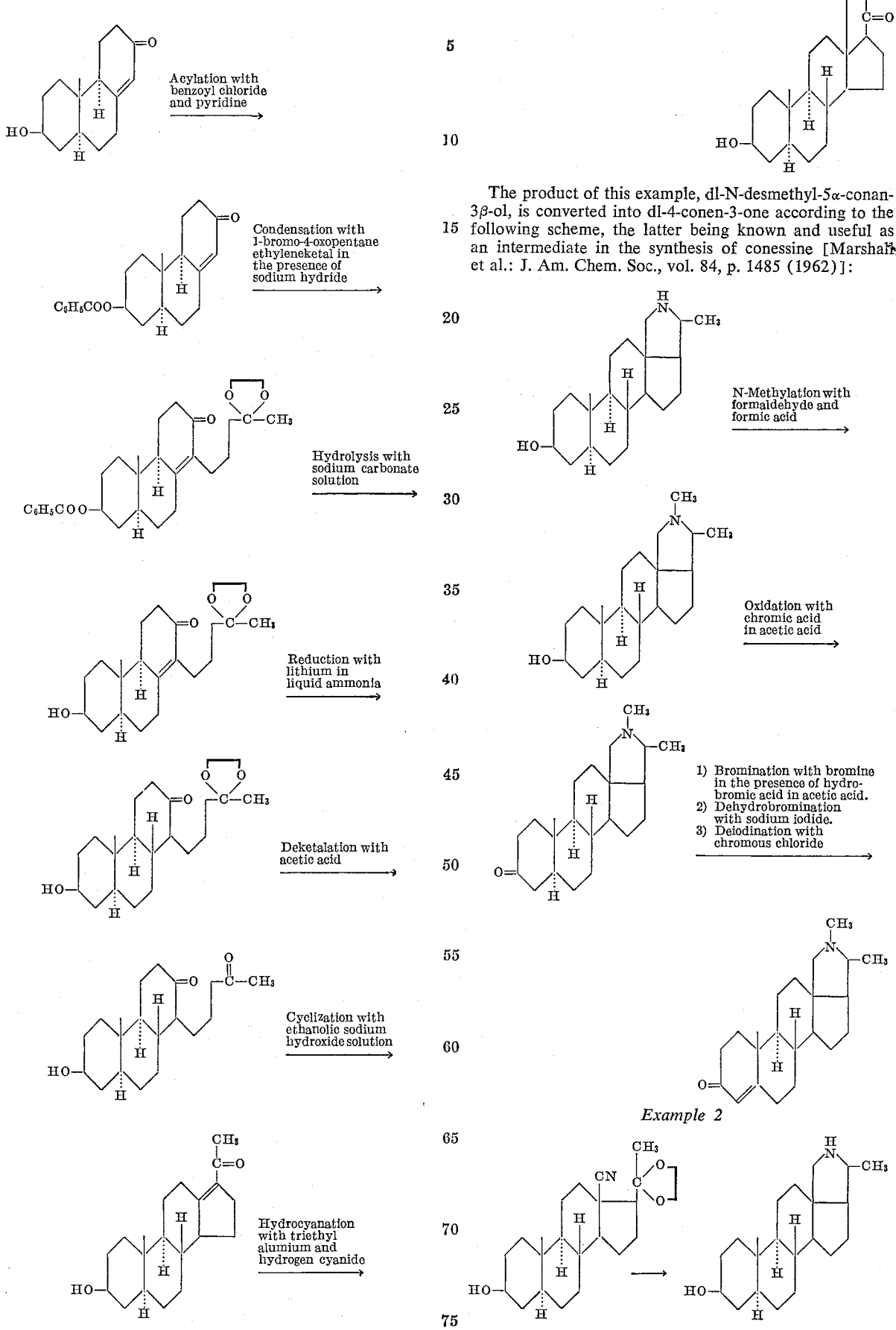
The product of this example, dl-N-desmethyl-5α-conan-3β-ol, is converted into dl-4-conen-3-one according to the following scheme, the latter being known and useful as an intermediate in the synthesis of conessine [Marshall, et al.: J. Am. Chem. Soc., vol. 84, p. 1485 (1962)]:
Example 2

Preparation of dl-N-desmethyl-5α-conan-3β-ol: To a suspension of lithium aluminum hydride (12.0 g.) in a mixture of anhydrous diglyme (340 ml.) and anhydrous tetrahydrofuran (170 ml.), there is added dropwise a solution of dl-3β-hydroxy-20-oxo-5α-pregnane-18-nitrile ethyleneketal (6.1 g.) in a mixture of anhydrous diglyme (130 ml.) and anhydrous tetrahydrofuran (65 ml.) at room temperature (10 to 30° C.). The resultant mixture is heated at 95 to 100° C. for about 50 hours while stirring. In the course of heating, lithium aluminum hydride (12.0 g.) is added portionwise thereto every 24 hours. The reaction mixture is allowed to stand at room temperature overnight and then treated as in Example 1 to give dl-N-desmethyl-5α-conan-3β-ol (3.0 g.).

*Example 3*

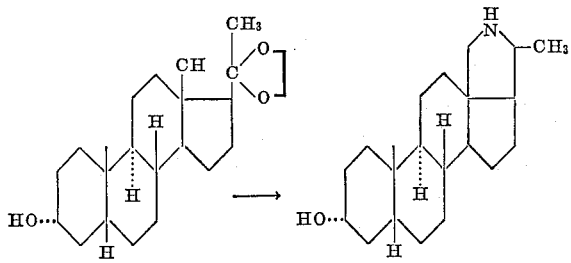

Preparation of dl-N-desmethyl-5β-conan-3α-ol: To a suspension of lithium aluminum hydride (12.0 g.) in a mixture of anhydrous diglyme (340 ml.) and anhydrous tetrahydrofuran (170 ml.), there is added dropwise a solution of dl - 3α-hydroxy-20-oxo-5β-pregnane-18-nitrile ethyleneketal (5.8 g.) in a mixture of anhydrous diglyme (130 ml.) and anhydrous tetrahydrofuran (65 ml.) at room temperature (10 to 30° C.). The resultant mixture is heated around 100° C. for about 60 hours while stirring. In the course of heating, lithium aluminum hydride (12.0 g.) is added portionwise thereto every 24 hours. The reaction mixture is treated as in Example 1 to give dl-N-desmethyl-5β-conan-3α-ol (2.8 g.).

The starting material of this example, dl-3α-hydroxy-20-oxo-5β-pregnane-18-nitrile ethyleneketal, is known. The product of this example, dl-N-desmethyl-5β-conan-3α-ol, is also known and useful as an intermediate in the synthesis of conessine [Marshall et al.: J. Am. Chem. Soc., vol. 84, p. 1485 (1962)].

What is claimed is:

1. A single step process for converting γ-ketalated oxopregnane nitrile into the corresponding pyrrolidine compound, which consists essentially in treating the γ-ketalated oxo nitrile aluminum hydride in an inert organic solvent at a temperature from about 60° C. up to decomposing temperature of the aluminum hydride until the aforesaid corresponding pyrrolidine compound is formed.

2. A process according to claim 1, wherein the starting γ-ketalated oxo-pregnane nitrile is 3-hydroxy-20-oxo-pregnane-18-nitrile ethyleneketal.

3. A process according to claim 1 wherein the aluminum hydride is lithium aluminum hydride.

4. A process according to claim 2, wherein the aluminum hydride is lithium aluminum hydride.

5. A process according to claim 1, wherein the molar ratio of starting γ-ketalated oxo nitrile to aluminum hydride is 1 to 20–100.

6. A process according to claim 2, wherein the molar ratio of starting γ-ketalated oxo nitrile to aluminum hydride is 1 to 20–100.

7. A process according to claim 1, wherein the reaction temperature is from about 80 to about 110° C.

8. A process according to claim 2, wherein the reaction temperature is from about 80 to about 110° C.

No references cited.

LEWIS GOTTS, *Primary Examiner.*